(12) United States Patent
Kreiner et al.

(10) Patent No.: US 10,213,696 B2
(45) Date of Patent: *Feb. 26, 2019

(54) ADAPTATION OF GAMING APPLICATIONS TO PARTICIPANTS

(71) Applicant: AT&T Intellectual Property I, L.P., Atlanta, GA (US)

(72) Inventors: Barrett M. Kreiner, Woodstock, GA (US); Steven A. Wright, Roswell, GA (US); Christian Kuhtz, Roswell, GA (US); Samuel N. Zellner, Dunwoody, GA (US); Robert J. Starr, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 478 days.

This patent is subject to a terminal disclaimer.

(21) Appl. No.: 14/990,983

(22) Filed: Jan. 8, 2016

(65) Prior Publication Data

US 2016/0121222 A1 May 5, 2016

Related U.S. Application Data

(63) Continuation of application No. 13/861,481, filed on Apr. 12, 2013, now Pat. No. 9,262,046, which is a (Continued)

(51) Int. Cl.
*A63F 13/79* (2014.01)
*A63F 13/48* (2014.01)
(Continued)

(52) U.S. Cl.
CPC ............. *A63F 13/79* (2014.09); *A63F 13/12* (2013.01); *A63F 13/48* (2014.09); *G06F 9/4451* (2013.01); *G06F 17/30035* (2013.01); *A63F 2300/554* (2013.01); *A63F 2300/5586* (2013.01); *A63F 2300/609* (2013.01); *G06F 3/048* (2013.01); *G06F 3/04817* (2013.01); *G06F 2206/1008* (2013.01); *G06T 2200/24* (2013.01); *G09G 5/00* (2013.01); *G09G 2340/14* (2013.01)

(58) Field of Classification Search
CPC .. A63F 13/12; A63F 13/70; A63F 9/24; A63F 2300/5546; A63F 2300/5586; G06F 17/30035; G06F 9/4451; G06T 2206/1008; G06T 2200/24
See application file for complete search history.

(56) References Cited

U.S. PATENT DOCUMENTS 5,926,179 A 7/1999 Matsuda et al.
5,942,969 A 8/1999 Wicks
(Continued)

OTHER PUBLICATIONS

Bartlett et al, "Using Games as a Means for Collaboration", Proceedings of the 11*th* International Multimedia Modeling Conference, Jan. 12-13, 2005.
(Continued)

*Primary Examiner* — Michelle L Sams
(74) *Attorney, Agent, or Firm* — Hartman & Citrin LLC

(57) ABSTRACT

Methods, systems, and products adapt gaming applications to participants. Should one of the participants be a minor, for example, the gaming application may adapt to scenarios that are appropriate for minors. Similarly, the gaming application may adapt to customs associated with a country of a participant.

15 Claims, 3 Drawing Sheets

Related U.S. Application Data continuation of application No. 11/472,810, filed on Jun. 22, 2006, now Pat. No. 8,441,501.

(51) Int. Cl.

| | | |
|---|---|---|
| *G06F 17/30* | (2006.01) | |
| *G06F 9/445* | (2018.01) | |
| *A63F 13/30* | (2014.01) | |
| *G06F 3/048* | (2013.01) | |
| *G06F 3/0481* | (2013.01) | |
| *G09G 5/00* | (2006.01) | |

(56) References Cited

U.S. PATENT DOCUMENTS

| | | | |
|---|---|---|---|
| 6,139,433 | A | 10/2000 | Miyamoto et al. |
| 6,172,677 | B1 | 1/2001 | Stautner et al. |
| 6,215,498 | B1 | 4/2001 | Filo et al. |
| 6,315,668 | B1 | 11/2001 | Metke et al. |
| 6,320,495 | B1 | 11/2001 | Sporgis |
| 6,354,948 | B1 | 3/2002 | Nagayama |
| 6,527,641 | B1 | 3/2003 | Sinclair et al. |
| 6,795,084 | B2 | 9/2004 | Newman |
| 7,086,005 | B1 | 8/2006 | Matsuda |
| 7,265,663 | B2 | 9/2007 | Steele |
| 7,373,377 | B2 | 5/2008 | Altieri |
| 7,396,281 | B2 | 7/2008 | Mendelsohn et al. |
| 7,435,179 | B1 | 10/2008 | Ford |
| 7,464,337 | B2 | 12/2008 | Han et al. |
| 7,584,124 | B2 | 9/2009 | Porat et al. |
| 2002/0010025 | A1 | 1/2002 | Kelly et al. |
| 2002/0052724 | A1 | 5/2002 | Sheridan |
| 2002/0082065 | A1 | 6/2002 | Fogel et al. |
| 2002/0090985 | A1 | 7/2002 | Tochner et al. |
| 2002/0138587 | A1 | 9/2002 | Koehler et al. |
| 2002/0184255 | A1 | 12/2002 | Edd et al. |
| 2003/0055984 | A1 | 3/2003 | Shimakawa et al. |
| 2003/0059005 | A1 | 3/2003 | Meyerson et al. |
| 2003/0135493 | A1 | 7/2003 | Phelan et al. |
| 2003/0177187 | A1 | 9/2003 | Levine et al. |
| 2004/0044529 | A1 | 3/2004 | Murakami |
| 2004/0109023 | A1 | 6/2004 | Tsuchiya |
| 2004/0111479 | A1 | 6/2004 | Borden et al. |
| 2004/0153557 | A1 | 8/2004 | Shochet et al. |
| 2004/0219961 | A1 | 11/2004 | Ellenby et al. |
| 2005/0004984 | A1 | 1/2005 | Simpson |
| 2005/0004985 | A1 | 1/2005 | Stochosky |
| 2005/0154574 | A1 | 7/2005 | Takemura et al. |
| 2005/0207617 | A1 | 9/2005 | Sarnoff |
| 2005/0267663 | A1 | 12/2005 | Naono et al. |
| 2006/0045082 | A1 | 3/2006 | Fertell et al. |
| 2006/0079330 | A1 | 4/2006 | Dvorak et al. |
| 2006/0095262 | A1 | 5/2006 | Danieli |
| 2006/0105838 | A1 | 5/2006 | Mullen |
| 2007/0149286 | A1 | 6/2007 | Bemmel |
| 2007/0218997 | A1 | 9/2007 | Cho |
| 2007/0260687 | A1 | 11/2007 | Rao et al. |
| 2008/0056466 | A1 | 3/2008 | Nishimura |

OTHER PUBLICATIONS

Rashid et al, "Extending Cyberspace: Location Based Games Using Cellular Phones", ACM Computers in Entertainment, vol. 4, No. 1, Jan. 2006.

Tavares et al, "Hyperpresence—An Application Environment for Control of Multi-User Agents in Mixed reality Spaces", Proceedings of the $36^{th}$ Annual Simulation Symposium, Mar. 30-Apr. 2, 2003.

Gord Goble, "F1 Challenge '99-'02", GamesSpot, pp. 1-4.

Blackhole Motorsports, www.bhmotorsports.com/NT2004/screenshots/7571, Sep. 23, 2003 (Date determined by WayBackMachine at www.archive.org), pp. 1-2.

"NBA Live 2003 review" by G. Varanini, Nov. 27, 2002, GameSpot, 3 pages.

Wadley et al, "Towards a Framework for Designing Speech-Based Player Interaction in Multiplayer Online Games", Proceedings of the $2^{nd}$ Australian Conference on Interactive Entertainment, Nov. 2005.

Halloran et al, "Does It Matter If You Don't Know Who's Talking? Multiplayer Gaming with Voiceover IP", Conference on Human Factors in Computing Systems, 2004.

U.S. Office Action dated Oct. 3, 2008 in U.S. Appl. No. 11/472,810.
U.S. Office Action dated Feb. 23, 2009 in U.S. Appl. No. 11/472,810.
U.S. Office Action dated Jul. 24, 2009 in U.S. Appl. No. 11/472,810.
U.S. Office Action dated Jan. 13, 2010 in U.S. Appl. No. 11/472,810.
U.S. Office Action dated May 6, 2010 in U.S. Appl. No. 11/472,810.
U.S. Office Action dated Aug. 23, 2010 in U.S. Appl. No. 11/472,810.
U.S. Office Action dated Jan. 26, 2011 in U.S. Appl. No. 11/472,810.
U.S. Office Action dated Jul. 21, 2011 in U.S. Appl. No. 11/472,810.
U.S. Office Action dated Oct. 31, 2011 in U.S. Appl. No. 11/472,810.
U.S. Office Action dated Apr. 4, 2012 in U.S. Appl. No. 11/472,810.
U.S. Office Action dated Jul. 25, 2012 in U.S. Appl. No. 11/472,810.
U.S. Notice of Allowance dated Jan. 17, 2013 in U.S. Appl. No. 11/472,810.
U.S. Office Action dated May 26, 2015 in U.S. Appl. No. 13/861,481.
U.S. Notice of Allowance dated Oct. 9, 2015 in U.S. Appl. No. 13/861,481.

ADAPTATION OF GAMING APPLICATIONS TO PARTICIPANTS

CROSS-REFERENCE TO RELATED APPLICATIONS

This application is a continuation of U.S. patent application Ser. No. 13/861,481 filed Apr. 12, 2013, and since issued as U.S. Pat. No. 9,262,046, which is a continuation of U.S. patent application Ser. No. 11/472,810 filed Jun. 22, 2006, and since issued as U.S. Pat. No. 8,441,501, with both applications incorporated herein by reference in their entireties.

BACKGROUND

This invention relates to simulation and other virtual settings and more particularly to providing adaptive access to various virtual settings.

Gaming devices are well known. Gaming can be viewed as a form of simulation. The early versions of games in a gaming device attached to a television monitor or played on a personal computer consisted of simple games like 'pong' in which a player played against the computer. As more powerful processors became available in personal computers, games having more complex features were developed. These games permitted participation by multiple players for example.

The more powerful processors also enabled the use of graphics within the games. Graphics provide a more elaborate and lifelike background or user interface. Participants in some computer games or simulated sporting events (such as boxing for example) may be represented by a graphical representation so that a participant's action can be replicated or presented on the display. The effect of one participant's action on another participant may similarly be displayed. As a result, the gaming experience has become more realistic and personal.

The advent of networks has added another dimension to the gaming experience. It is now possible for participants at different physical locations to engage in a game over a network such as the internet for example. Thus, there is no longer a geographic limitation to the participant's location—they can be in the next room or on another continent. In some instances, strangers can participate in an interaction with each other.

Unfortunately, such interaction also facilitates criminal activity. In gaming over the network for example, criminals and predators have an opportunity to interact with trusting participants. Individuals with nefarious intentions often gain the trust of unsuspecting participants and obtain information about the participants. This information may then be used to commit crimes against the participants. Information relating to identification, a credit card, a bank account, etc., can be obtained and used for illegal purposes. In more serious aspects, predators are known to identify and commit crimes against juvenile victims by establishing trust and obtaining information.

Accordingly, there is a need to identify participants in a virtual environment and adapt the virtual environment for a participant based on the participant's identity.

SUMMARY

In one embodiment, a method for adapting a virtual setting to a participant includes launching a simulation program on a computing device, evaluating a virtual profile of the participant and presenting scenarios within the virtual setting appropriate for said participant based on said evaluation, wherein at least a predetermined aspect of the virtual setting is available to the participant regardless of a result of said evaluation and the virtual setting corresponds to the simulation program.

In another embodiment, a computing device comprises a communication means and a processing means. The communication means receives an established virtual profile of a participant in a simulation program, the profile being based on information provided by the participant, and provides interaction between a plurality of participants at different locations. The processing means launches the simulation program, evaluates the received profile and presents a user interface appropriate for the participant based on the evaluation wherein the user interface corresponds to the simulation program. At least a predetermined user interface is presented to the participant regardless of a result of the evaluation.

In yet another embodiment, a computer-readable medium contains a computer program for adapting a virtual setting to a participant. The computer program, when executed on a computing device, causes the computing device to launch a simulation program on a computing device, evaluate a virtual profile of the participant and present scenarios within the virtual setting appropriate for the participant based on the evaluation, wherein at least a predetermined aspect of the virtual setting is available to the participant regardless of a result of the evaluation and the virtual setting corresponds to the simulation program.

BRIEF DESCRIPTION OF THE DRAWINGS

The various features, advantages, and objects of the invention will be understood by reading this description in conjunction with the drawings, in which.

DETAILED DESCRIPTION

Figure 1:
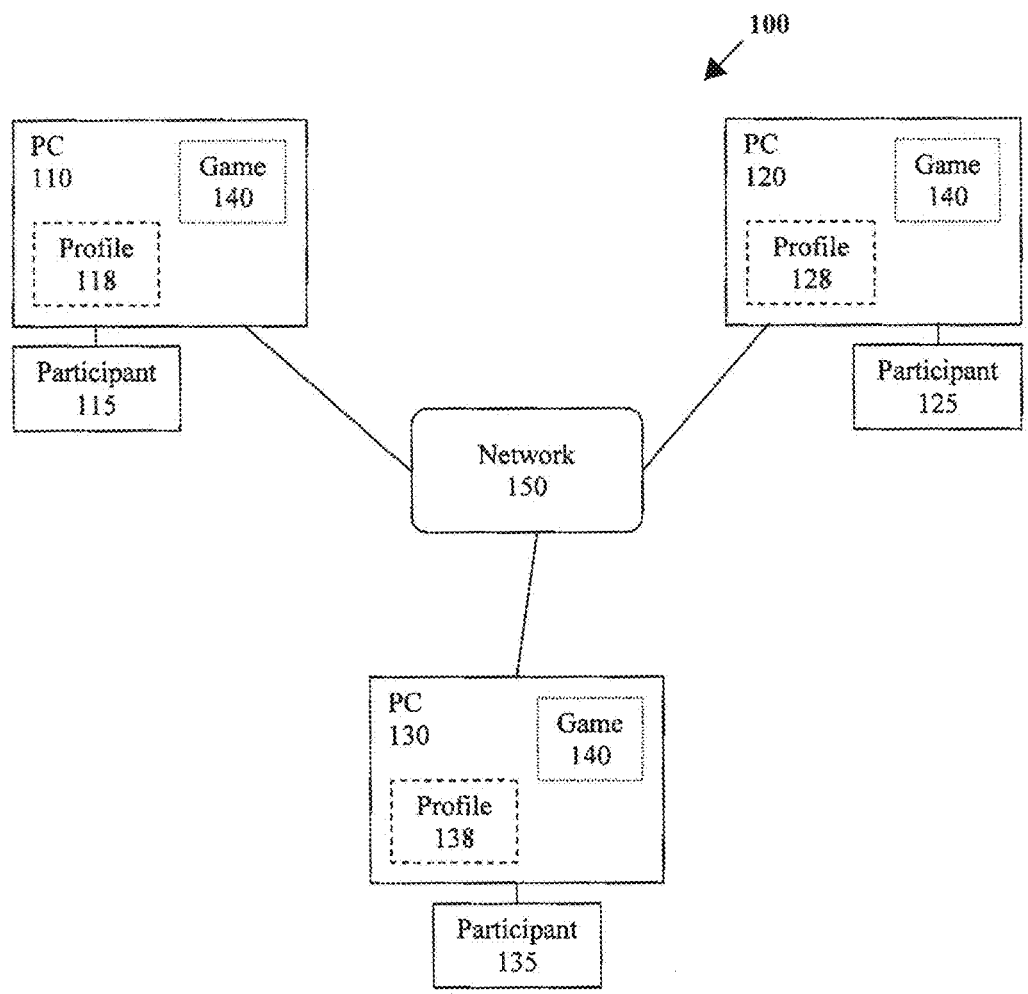
FIG. 1 illustrates a system according to an exemplary embodiment.

The following description of the implementations consistent with the present invention refers to the accompanying drawings. The same reference numbers in different drawings identify the same or similar elements. The following detailed description does not limit the invention. Instead, the scope of the invention is defined by the appended claims.

In general, the present invention is a simulated event such as a gaming application executing on a computing device. Specifically, the simulated event is dynamically adapted to a participant engaging in the simulated event based on evaluation of the participant's virtual profile. A user interface within which a participant interacts in the gaming application may vary based on the participant profile.

A simulated event may include a virtual game executing on a computer for example. The simulated event is a computer program implemented as executable code on a computer-readable medium. The computer-readable medium may be a compact disc and the game may be loaded onto a personal computer for example. In a simulated event between multiple participants, at least portions of the game may be loaded onto each of the participants' computers. The game may also be loaded onto a server on the network.

Participants within a simulated (such as gaming for example) environment may be represented by a profile. A profile is a known concept used to facilitate anonymous interaction between individuals in a wide array of settings such as chat rooms, bulletin boards, etc., within the cyber world. A profile may be created or established by either the participant or by a computer program.

A user profile in exemplary embodiments may be created based on, among other things, a participant's age, geographic location, background history, credit and other financial information. A participant may provide such information to a trusted authority for establishing the profile. Once established, the profile may be used in various virtual games. The participant may be required to have the profile updated. A profile may also be updated dynamically. For example, a user profile may be updated by reviewing history of sites visited (on the internet for example) by a participant or contents searched, etc.

In some embodiments, the game may be adapted to a participant based on evaluating the participant's profile. A participant's age may be used to prevent a participant's access to aspects of a game that are inappropriate for the participant. If the profile indicates that the participant is a minor, the participant's access to aspects of the game that contain adult material may be restricted. Adult material may include sexual or violent content for example.

A participant's location may also be used to adapt the game to the participant. Since gaming over a network facilitates interaction between participants from different parts of the world, the various cultural norms may be observed. As cultural differences lead to different interpretations of a particular event, an event that is acceptable in one culture may seem offensive or embarrassing in another culture for example. In some embodiments, a game situation may be presented in different ways to different participants based on the participants' geographic location. If a game scenario depicts people from country X as the targets for attack for example, the game may be adapted to portray someone else as the targets if the participant is in country X. A game may be designed and implemented in such a manner to facilitate such different presentations.

A participant's location may also be used to permit or restrict access to certain aspects of a game situation in some embodiments. This may be appropriate in dealing with participants from certain political jurisdictions that restrict access to types of content such as particular political points of view for example.

A participant's background history may be used to restrict access to certain aspects of an online gaming environment in order to protect other participants. A participant may be a convicted child molester for example. Given the need to track such individuals, exemplary embodiments may be utilized to restrict or eliminate such participant's access to other gaming participants that may be vulnerable.

A user profile may enable such monitoring and access control. Upon establishing a profile after a participant submits his or her personal information to a trusted authority, such authority may conduct a background check such as credit check and criminal or legal background check. In exemplary embodiments, a profile may be updated (periodically for example) to reflect participant activity after the profile has been established.

A system 100 according to an exemplary embodiment may be illustrated with reference to FIG. 1. A plurality of computing devices 110, 120 and 130 may communicate with each other over a network 150. Computing device 110, 120 and 130 may also facilitate a gaming or simulation interaction between participants over network 150. Each of the computing devices 110, 120, 130 may include a gaming or simulation program 140. A plurality of participants 115, 125 and 135 may launch program 140 (such as a gaming or a simulation program, for example) on respective computing devices 110, 120 and 130. Each of the computing devices 110, 120 and 130 may also include the corresponding participant profile (118, 128, 138) stored thereon. Network 150 may be a public network such as the internet, for example, and accessible over a secure connection. Network 150 may also be a private network. A participant may communicate with network 150 over a wired or a wireless interface. Each of computing devices 110, 120 and 130 may be a personal computer (PC), a laptop computer, a personal digital assistant (PDA), a gaming console or other similar devices. The game may be displayed on a monitor.

A participant's profile may be pre-loaded in his or her computer. A profile may also be stored in a network-accessible location as well. The program (game 140 for example) may be launched and the participant's access privileges may be determined based on the profile.

As described above, gaming or simulation programs may be programmed to include a number of different scenarios for each possible situation that is encountered within the game. Each of the scenarios may correspond to a particular profile type. A gaming application may be directed to shooting targets such as aliens, for example. If a profile reflects an adult participant (i.e. older than 18 years of age, for example), then the target may be represented by a character having an odd-shaped head, for example. If the profile reflects a minor participant (a ten-year-old, for example), then the target may be represented by a cartoon character. During the course of the game, participants may aim to shoot the alien, for example. While the adult participant may be presented with a display of the alien being shot and blood flowing, the minor may be presented with the cartoon character falling down, for example.

Figure 2:
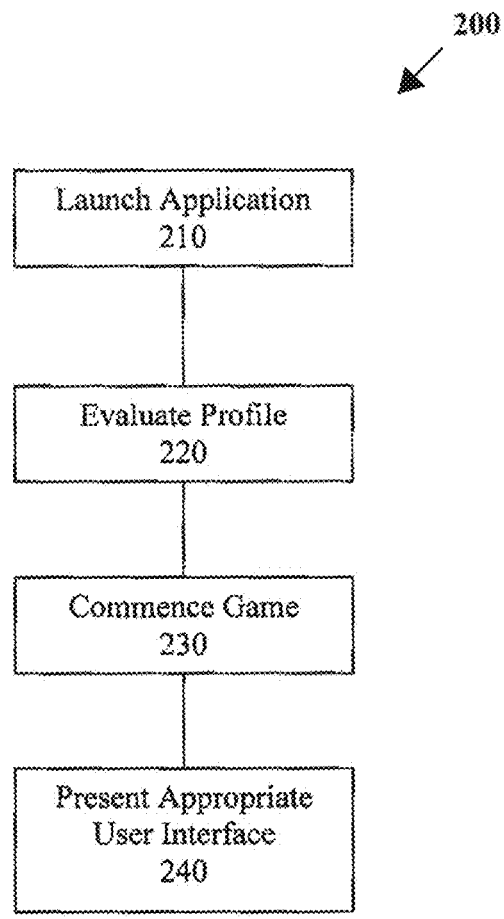
FIG. 2 illustrates an exemplary motorway utilized for an automobile race.

An exemplary method 200 may be described with reference to FIG. 2. A participant (or plurality of participants) may launch (or execute) a gaming application (or a simulation program) on a computing device (or devices) at 210. The profile for a participant may be pre-loaded onto the participant's computer. The profile may be evaluated at 220. The game (or simulation program) may commence at 230. Game or simulation scenarios may be presented to each of the participants based on a determined profile for a particular participant at 240. The scenario may correspond to an animal or a cartoon character as described above, for example.

While the above-mentioned scenario describes two possible variations (alien or cartoon character), additional variations may similarly be included in a gaming application. If an online interaction within a gaming application involves three participants, a different scenario may be presented to each of the three participants. That is, for each participant, an individual profile may be evaluated prior to determining which scenario to present within a gaming application user interface. A particular profile or user interface may be presented to more than one participant if the participants correspond to one profile.

Figure 3:
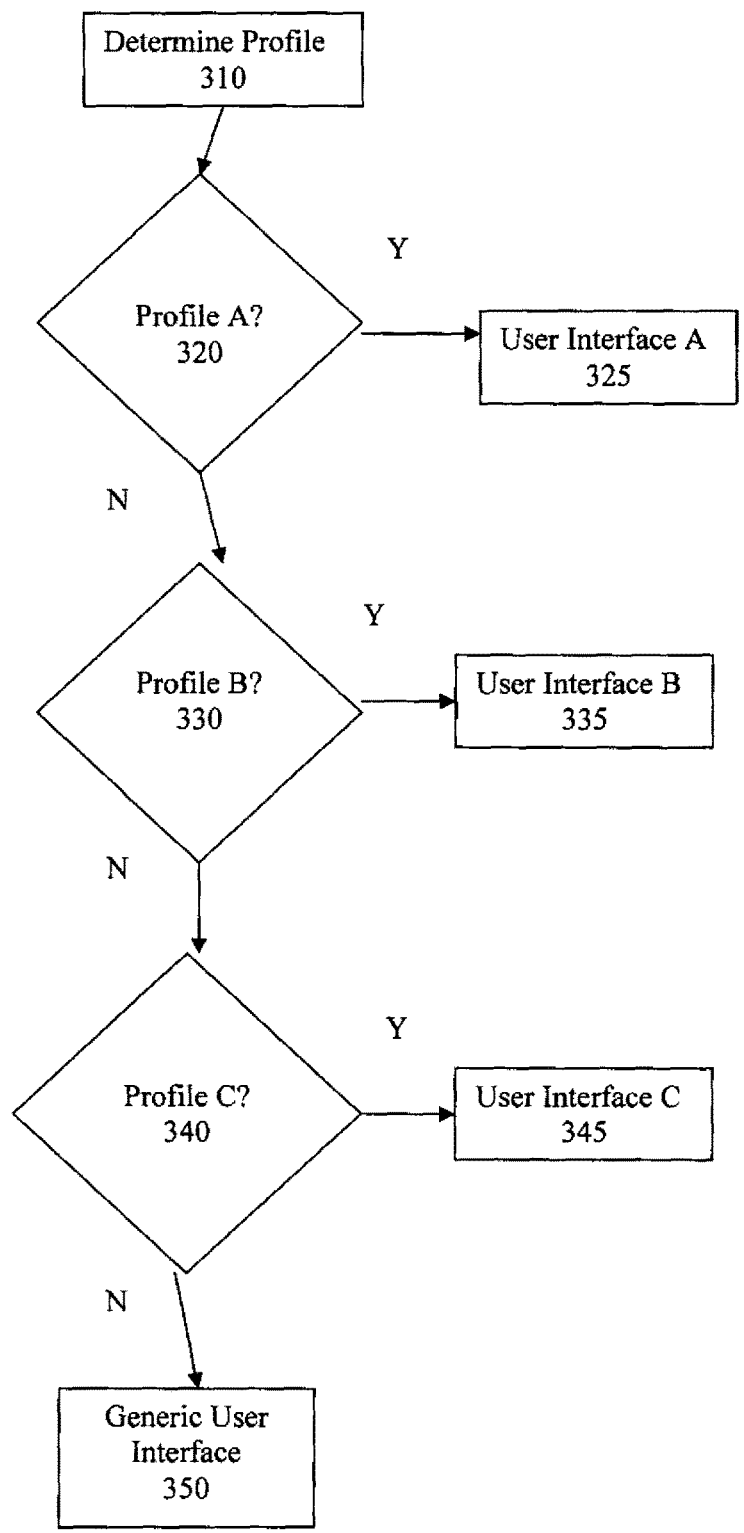
FIG. 3 illustrates an exemplary method for providing data from a virtual setting to a real-time device.

As illustrated in FIG. 3 for example, a participant profile may be determined at 310. If a participant belongs to profile A at 320, then user interface corresponding to profile A may be presented at 325. Similarly, if the participant belongs to profile B at 330, then user interface corresponding to profile B may be presented at 335 and if the participant belongs to profile C at 340, then user interface corresponding to profile C may be presented at 345. If the participant does not fit into an established profile or the profile cannot be determined for some reason or if a profile has not been established, then a generic user interface may be presented at 350.

In some embodiments, if a profile indicates that a first participant is a child predator for example, the participant's ability to interact with another (i.e., second or third, for example) participant that is a child may be restricted or forbidden. One type of current interaction may include a voice channel for communicating over a network, for example. In such a case, the voice channel may be disabled. The first participant's ability to interact with additional participants that are not minors may be maintained (i.e., not restricted, etc.).

If a participant profile is not available for evaluation, then the participant's ability to engage in a simulated or gaming environment may still be permitted but may be limited to certain generic aspects. In other words, until the profile becomes available or the participant verified, participant interaction may be limited in order to protect other participants. Such access (i.e. to generic aspects) may be permitted even if the participant has a questionable profile.

Some embodiments take into account the passage of time. A participant may be sixteen years of age (i.e., a minor) at the time of establishing a profile and permitted to interact in a user interface having a juvenile theme. Two years later, since the participant is no longer a minor, the participant may interact in a user interface designed for adults. The profile may thus be updated or dynamically maintained.

It is expected that this invention can be implemented in a wide variety of environments. For example, principles of this invention can be used to provide targeted advertisement or product promotions based on participant profile. The advertisements may change to reflect a participant getting older for example. The profile may be maintained for a period of time if the participant ceases participation; the profile may also be maintained permanently. Furthermore, while the description provides examples of interactive gaming between participants over a network, the gaming program is not limited to such environment. For example, a participant may interact with the computer in playing a computer game. The participant profile in this embodiment also serves to determine which user interface within a program is to be made available to the participant.

Exemplary embodiments can be within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

It will also be appreciated that procedures described above are carried out repetitively as necessary. To facilitate understanding, aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

It is emphasized that the terms "comprises" and "comprising," when used in this application, specify the presence of stated features, integers, steps, or components and do not preclude the presence or addition of one or more other features, integers, steps, components, or groups thereof.

Thus, this invention may be embodied in many different forms, not all of which are described above, and all such forms are contemplated to be within the scope of the invention. The particular embodiments described above are merely illustrative and should not be considered restrictive in any way. The scope of the invention is determined by the following claims, and all variations and equivalents that fall within the range of the claims are intended to be embraced therein.

The invention claimed is:

1. A method comprising:

receiving, by a first device comprising a processor and a memory, a selection associated with a gaming application, the selection requesting interaction, via a voice channel, between the first device and a second device, the first device associated with a first participant of the gaming application, and the second device associated with a second participant of the gaming application;

retrieving, by the first device, a profile associated with the first participant, wherein the profile comprises information of the first participant determined by a background check associated with the first participant of the gaming application;

determining, by the first device, from the profile, that the first participant is associated with criminal activity; and in response to determining that the first participant is associated with criminal activity, disabling, by the first device, an ability of the first device to establish the voice channel between the first device and the second device.

2. The method of claim 1, further comprising adapting the gaming application to the background check associated with the first participant.

3. The method of claim 1, further comprising adapting the gaming application to the profile associated with the first participant.

4. The method of claim 1, further comprising retrieving a location associated with the first participant.

5. The method of claim 1, further comprising retrieving an age associated with the first participant.

6. A device comprising:

a processor; and a memory, the memory storing code, the code when executed causing the processor to perform operations, the operations comprising:

receiving a selection associated with a gaming application, the selection establishing a voice channel with another device, the device associated with a first participant of the gaming application, and the another device associated with a second participant of the gaming application;

retrieving information associated with a background check associated with the first participant of the gaming application;

determining, from the information associated with the background check, that the first participant is associated with criminal activity; and disabling the voice channel in response to the first participant being associated with the criminal activity.

7. The device of claim 6, wherein the operations further comprise adapting the gaming application to the background check.

8. The device of claim 6, wherein the operations further comprise retrieving a profile associated with the first participant.

9. The device of claim 8, wherein the operations further comprise adapting the gaming application to the profile.

10. The device of claim 6, wherein the operations further comprise retrieving a location associated with the first participant.

11. The device of claim 6, wherein the operations further comprise retrieving an age associated with the first participant.

12. A memory device storing instructions that when executed cause a processor of a first device to perform operations, the operations comprising:

receiving a selection associated with a gaming application, the selection establishing a voice channel between the first device and a second device, the first device associated with a first participant of the gaming application, and the second device associated with a second participant of the gaming application;

retrieving a profile associated with the first participant, wherein the profile comprises information of the first participant determined by a background check associated with the first participant of the gaming application;

determining, from the profile, that the first participant is associated with criminal activity; and in response to determining that the first participant is associated with criminal activity, disabling the voice channel between the first device and the second device.

13. The memory device of claim 12, wherein the operations further comprise adapting the gaming application to the background check.

14. The memory device of claim 12, wherein the operations further comprise adapting the gaming application to the profile.

15. The memory device of claim 12, wherein the operations further comprise retrieving a location associated with the first participant of the gaming application.

* * * * *